United States Patent
Khurana et al.

(10) Patent No.: US 8,793,790 B2
(45) Date of Patent: Jul. 29, 2014

(54) SYSTEM AND METHOD FOR INSIDER THREAT DETECTION

(75) Inventors: Himanshu Khurana, Plymouth, MN (US); Valerie Guralnik, Orono, MN (US); Robert Shanley, Lake Elmo, MN (US)

(73) Assignee: Honeywell International Inc., Morristown, NJ (US)

( * ) Notice: Subject to any disclaimer, the term of this patent is extended or adjusted under 35 U.S.C. 154(b) by 105 days.

(21) Appl. No.: 13/270,874

(22) Filed: Oct. 11, 2011

(65) Prior Publication Data

US 2013/0091539 A1    Apr. 11, 2013

(51) Int. Cl.
  *G06F 11/00*   (2006.01)
  *G06F 21/55*   (2013.01)
  *G06F 21/57*   (2013.01)
  *H04L 29/06*   (2006.01)

(52) U.S. Cl.
  CPC ............ *G06F 21/552* (2013.01); *G06F 21/577* (2013.01); *G06F 21/554* (2013.01); *H04L 63/1425* (2013.01); *H04L 63/1441* (2013.01)
  USPC .................................... 726/22; 726/1; 726/25

(58) Field of Classification Search
  USPC ..................................................... 726/1, 22
  See application file for complete search history.

(56) References Cited

U.S. PATENT DOCUMENTS

| | | | | |
|---|---|---|---|---|
| 7,145,457 | B2* | 12/2006 | Spitz et al. | 340/572.1 |
| 7,506,371 | B1* | 3/2009 | Ben-Natan | 726/18 |
| 7,594,266 | B2* | 9/2009 | Mattsson et al. | 726/22 |
| 8,041,743 | B2* | 10/2011 | Armstrong et al. | 707/794 |
| 8,056,130 | B1* | 11/2011 | Njemanze et al. | 726/22 |
| 8,356,001 | B2* | 1/2013 | Collazo | 706/14 |
| 2004/0193894 | A1* | 9/2004 | Chaudhari et al. | 713/186 |
| 2005/0099288 | A1* | 5/2005 | Spitz et al. | 340/506 |
| 2007/0083928 | A1* | 4/2007 | Mattsson et al. | 726/22 |
| 2007/0143851 | A1* | 6/2007 | Nicodemus et al. | 726/25 |
| 2008/0301120 | A1* | 12/2008 | Zhu et al. | 707/5 |
| 2010/0097213 | A1* | 4/2010 | Bajpay et al. | 340/540 |
| 2011/0039237 | A1* | 2/2011 | Skare | 434/118 |

* cited by examiner

*Primary Examiner* — Linglan Edwards

(74) *Attorney, Agent, or Firm* — Schwegman, Lundberg & Woessner, P.A.

(57) ABSTRACT

A system and method include obtaining data related to accessing cyber assets and accessing physical assets from a combined cyber access and physical access control system that protects cyber and physical assets of an organization from both authorized and unauthorized access with malicious intent. The system and method compare the data to known patterns of expected behavior, and identify patterns of suspicious behavior as a function of comparing the data to the patterns of expected behavior. The comparison is utilized to identify potentially malicious insider behavior toward the cyber and physical assets.

17 Claims, 3 Drawing Sheets

SYSTEM AND METHOD FOR INSIDER THREAT DETECTION

BACKGROUND

External threats are typically given most consideration when addressing cyber security. While advanced persistent threats leveraging phishing attacks, data breaches based on exploitation of externally facing web applications, and targeted attacks by loosely organized hacking groups get much of the media and product vendor attention, abuse by insiders represents a significant risk for which effective controls are lacking.

Insider threat detection is a major technological problem with high potential for in-demand products that are effective and easy to use. The insider threat is context-dependent in time and space, yet current detection approaches focus on forensic analysis of only cyber data to detect malicious acts—aiming to identify and discipline the perpetrator only after the fact. In general, the security analyst has the critical responsibility to make sense of the output of numerous tools, which are limited to information that can be extracted from cyber data.

SUMMARY

A system and method include obtaining data related to accessing cyber assets and accessing physical assets from a combined cyber access and physical access control system that protects cyber and physical assets of an organization from both authorized and unauthorized access with malicious intent. The system and method compare the data to known patterns of expected behavior, and identify patterns of suspicious behavior as a function of comparing the data to the patterns of expected behavior. The comparison is utilized to identify potentially malicious insider behavior toward the cyber and physical assets.

In one embodiment, the method is encoded on a computer readable storage device for access and execution by a computer processing system.

In a further embodiment, a device includes an access control system to receive data regarding behavior involving accessing physical and cyber assets. A storage device stores an insider threat reference model that includes patterns of expected behavior. An anomaly detector compares the data to the known patterns of expected insider behavior and identifies suspicious behaviors. An anomaly analysis engine uses identified suspicious behavior to identify potentially malicious behaviors toward the cyber and physical assets.

In a further embodiment, the data includes at least one of email traffic, internet traffic, remote access traffic, and at least one of building information model, card proxy, RFID, and physical access policies, and wherein data representative of expected behavior is selected from the group consisting of patterns of accessing physical and cyber resources in the work environment, physical and logical access to the assets consistent with the insider role, location, restricted access attempts, authentication attempts, web sites accessed, accessed file size, an installing scripts, and where suspicious behaviors are selected from the group consisting of change in work schedule, access attempts against privilege, suspicious movements, suspicious communications, and harvesting of proprietary data.

In still a further embodiment, the anomaly analysis engine provides alerts and notifications to a user. A policy refinement module facilitates dynamic modification of the access control policies by the user based on the alerts and notifications.

The insider threat reference model may further include at least one of a building information model, network topology, organizational policy and organization structure.

DETAILED DESCRIPTION

Figure 1:
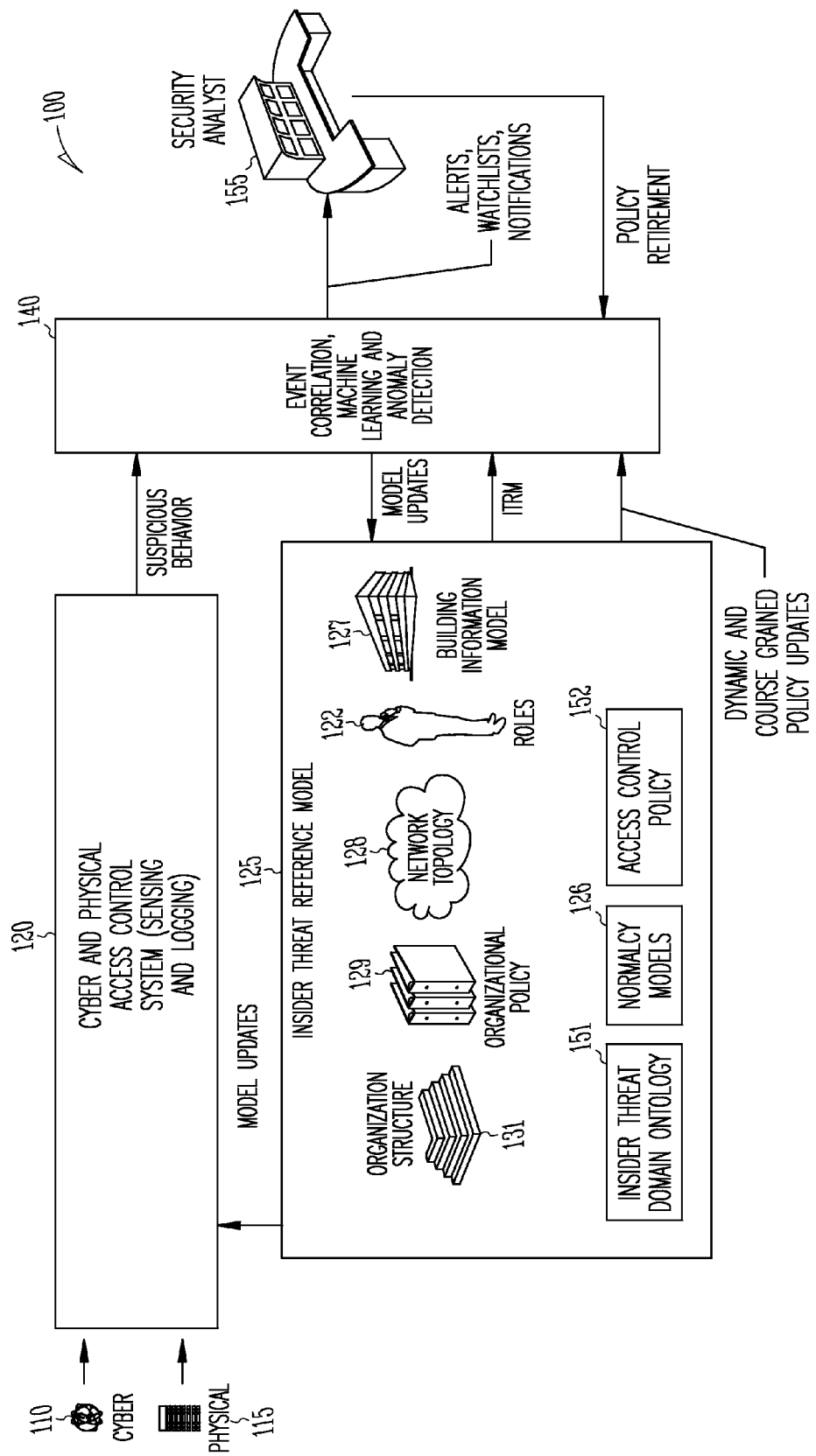
FIG. 1 is a block diagram of an access control system utilizing both cyber and physical access data to detect malicious activity according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Abuse by insiders represents a significant risk for which effective controls are lacking in prior systems. For example, in the financial industry, trusted insiders are the primary source of many losses—in 2008 French bank Societe Generale suffered approximately $7 billion in losses due to the actions of a junior trader. An insider threat can be considered as any individual who abuses privilege to cause harm to an organization. This definition includes intentional and unintentional privilege misuse, which results in a significantly large problem space.

The insider threat is context-dependent in time and space, yet current detection approaches focus on forensic analysis of only cyber data to detect malicious acts—aiming to identify and discipline the perpetrator only after the fact. In general, the security analyst has the critical responsibility to make sense of the output of numerous tools, which are limited to information that can be extracted from cyber data. Existing approaches for access control mainly focus on keeping outsiders out and are ineffective in preventing insider misuse. Further, detection tools and access control systems are typically not integrated and may violate compliance and policy requirements.

Existing access-control and anomaly-detection systems fail to adequately protect resources against malicious insiders. These existing systems typically address the problem either from a strictly physical or strictly cyber perspective, which often makes it impossible both to accurately specify desired access-control policies and to accurately detect potentially malicious insider behavior.

Current approaches to insider threat detection are forensic-based and usually limited to examining cyber security logs to apply anomaly detection or signature matching algorithms. These algorithms, while essential for insider threat detection, are only one part of a complete solution. More importantly, they do not adequately consider the limitations of information that can be extracted from cyber data, the reduction of false positives, and effective access policies for insider threat prevention. An integrated solution to insider threat detection and prevention leverages semantically tagged data from both cyber and physical access control infrastructures and provides proactive, early, reliable discovery of insider exploitation or destruction of data.

Diverse data sources are analyzed to infer capability, opportunity, and intent of malicious insiders. Machine learning algorithms use observations from cyber and physical access systems to build normalcy models. Hierarchical organization of minimal models will allow recognition of subtle abnormal situations. Multiple algorithms provide corroboration needed to minimize false alarms. In one embodiment, a semantic graph reasoning engine is modified to aggregate outputs of anomaly detectors to identify likely malicious situations and dismiss benign anomalies. The reasoning engine's reference model is modified to record machine learning interpretations of anomalous outputs, the relationships between anomalies, and the importance of hypothesized malicious behaviors. A fine-grained access control policy specification mechanism is modified to express nuanced policies geared not only at keeping outsiders from protected assets, but also preventing misuse by malicious insiders without compromising the assets' availability for legitimate access and use. Policy creation and refinement will be informed by outputs of anomaly detectors to include the factors that caused an access to be flagged as unusual.

Because it can learn expected normal behaviors, our combination of technologies will incur a low deployment cost. Dynamic addition of new data types and sources is done through the reasoning system's domain independence that allows new data sources to contribute to the system's world view without changes to the reasoning engine. An open architecture allows the system to evolve along with the state of the art of anomaly detection methods, machine learning algorithms, and access control technologies. A mechanism for specifying fine-grained access policies will significantly narrow the gap between desired access control policies and implemented policies.

In some embodiments, the threat detection system predicts and hypothesizes behaviors indicating in-progress insider attacks by collecting raw cyber and physical data, analyzing observations obtained from the raw data, and detecting suspicious behaviors. In some embodiments, policy-specification languages for policy makers may be used to express nuanced policies for implementation and for access-control systems to enforce. System outputs will be used to refine policies to prevent future attacks.

Observations from cyber and physical access data are processed to infer suspicious behaviors.

Suspicious behaviors are the interpretations of intentions and actions based on observations and represent suspicious and possibly malicious activities. In some embodiments, indicator inference is based on anomaly detection and requires examining the observation stream for unusual patterns that indicate a change in person's habits/role, intentional or unintentional policy violation, access control system misconfiguration, or active malicious behavior.

To detect anomalies, machine learning algorithms will induce normalcy models of two types from observations obtained from cyber or physical access logs: action pattern-based models of normal approaches for achieving goals or information-theoretic models of normal activity scopes. To avoid over-fitting and increased false positive rates, sub-space clustering is used to learn the appropriate features for each model.

Reducing the number of false alarms is done using corroboration and correlation of suspicious behaviors detected by the various algorithms. The threat detection system exploits the overlap in the suspicious behaviors that models can detect.

The threat detection system explores the hypothesis space to determine which suspicious behaviors are consistent with malicious behaviors and which have benign explanations. The suspicious behaviors-to-behavior belief propagation process may use a reasoning system, such as PNNL's CHAMPION (Columnar Hierarchical Auto-associative Memory Processing in Ontological Networks) reasoning system, which comprises a hierarchical structure of modified case-based reasoners (CBRs) extended with predictive functionality. The CBRs use description logic to decide if the observed data and suspicious behaviors propagated from lower in the hierarchy are consistent with the hypothesized malicious behavior, and if so, new "assertions" are dynamically stored in the system's working memory (a semantic graph structure). Unlike classical approaches that compare the hypothesis against all "cases" or the entire semantic graph (which can be prohibitively large), the more tractable CHAMPION system analyzes a subset of the semantic graph. To guide reasoning about physical access control infrastructures (time-location concepts) that are to be integrated with cyber data, ontological representations are added. The ontological representations reflect knowledge about space-time concepts as well as cyber behaviors. A distinct advantage of the CHAMPION reasoning approach is its ability to integrate data from multiple sources and propagate the analysis to higher level abstractions. Ontologies are also added to, to accommodate expected spatial/temporal relationships and even asynchronous arrival of spatial and cyber data and suspicious behaviors.

In some embodiments, policy specification languages and systems are used to express and enforce rich and nuanced access control policies.

Semantic tagging in policy creation may also be used. Semantic tagging specifies part of the policy based on the content of the resources being protected. It allows specification of policies that more closely match what policy makers are trying to achieve, making policy specification quicker, more convenient, and more accurate. This approach also makes it easier to understand the policy maker's intentions by reading an implemented policy.

Administrators may specify complex policies and react to potential breaches by revising existing or coarse-grained policies to be increasingly more accurate. In one embodiment, anomaly-detection algorithms are used to inform policy creation. Administrators may revise and fine-tune policies and that automatically suggest reformulating implemented policies so these policies explicitly include the factors that caused an anomaly-detection system to flag an unusual access. In this way, any anomalous access that is the result of an overly permissive policy will serve as a guide to correct or revise the policy to disallow other such accesses.

The threat detection system performance is not limited to single model accuracy and coverage. Instead, a series of machine learning algorithms that infer different aspects of insider behavior may be employed, using a diverse set of data. In some embodiments, explicit insider models are employed, where suspicious behaviors from multiple algorithms are reinforced to provide higher value alerts or explained to reduce false positives.

Reaction and protection through a fine-grained access policy specification mechanism may be used to deliver a high assurance of correctness due to its formal underpinnings, easy extensibility to incorporate new policies or policy paradigms, and, thanks to proofs of access that explain why an access was granted, excellent auditability and support for incremental revision.

Data from cyber and physical access logs of relevant domains where insider threat is a major concern (e.g., the financial and pharmaceutical sectors). may be used to build models for use in comparing patterns for abnormal behavior in further embodiments.

Various embodiments provide insider threat detection in scenarios where users conduct sensitive business in a protected building, for example, users at a financial systems facility like a bank. An example access control system 100 is illustrated in block form in FIG. 1.

Access control system 100 is an intelligent system that monitors individuals' interactions with critical assets for suspicious behaviors and warnings, automatically detects emerging threats in time to interdict, and adjusts its defenses to stop or mitigate insider attacks in progress. In one embodiment, system 100 incorporates algorithms that:

Integrate diverse data sources; in particular, cyber and physical access control data and compliance/policy considerations.

Implement multi-stage prediction, detection, and response to provide an integrated solution to insider threat problem.

Use context to learn rich behavior models of expected behavior or normalcy and detect suspicious behaviors of suspicious behaviors that may point to malicious behaviors, aggregate early suspicious behaviors into malicious behaviors or benign explanations, and select appropriate access control policies to protect critical assets against possible attacks in progress.

In some embodiments, the amount of data that security analysts need to review is reduced, allowing them to focus their attention on aggregated and correlated alerts that matter. Malicious behaviors of insiders may be detected before or shortly after the initiation of a malicious exploit—in time to mitigate the damage and respond to an attack.

Access control system 100 combines insider threat detection with automatic response, dynamic access policies, and learning, yielding an effective protection against insider threat. Information from access attempts to cyber assets 110 and physical assets 115 is provided to a cyber and physical access control system 120 that logs data from the sensors monitoring cyber and physical assets 110 and 115 and may also include further sensing capabilities.

The system 100 in some embodiments implements a fine-grained access policy specification framework to derive online access control decisions that will protect critical assets in a broad spectrum of possible insider attacks. Dynamic policies are used to enforce context-dependent access control, ensuring the availability of assets for legitimate, but possibly unusual, use while also preventing insider attacks in progress.

Tools that focus only on policy violation assessment provide an effective first line of defense but allow for insider exploits that avoid policy violations. The system 100 detects suspicious behaviors of suspicious behaviors and aggregates them to infer possible insider attacks. The approach for detecting suspicious behaviors is based on learning models of expected normal behaviors for persons having roles in an organization as indicated at 122 and recognizing deviations from these models. Current algorithms that detect indicators of malicious behaviors in cyber systems typically generate alarms when there is enough evidence in the cyber data to exceed a statistical threshold. While essential for detecting insider threats, current algorithms, with a myopic view of the data, tend to issue many false alarms and at the same time allow for detection gaps that may be exploited by savvy insiders. A primary reason for these limitations is the difficulty in learning insider behavior models in complex environments with a large number of potential parameters.

System 100 addresses this issue by abstracting learning problem into two distinct pieces, first learning context surrounding the observations, and then learning the relationships between those observations. Using both context and relational models to form an insider threat reference model 125 enables system 100 to detect suspicious behaviors in the presence of active deceit. Data from sensors monitoring behavior with respect to both cyber and physical resources are captured and processed to expand the view of the monitored individuals. Knowledge representation techniques are employed to exploit domain characteristics and expertise of security analysts. Domain knowledge heuristics are used to further constrain the space. Examples of domain knowledge can include layout of the building via a building information model 127, network topology 128, organizational policy 129, organization structure 131, as well as asset locations, organization's computing infrastructure, etc. Combining these techniques allows system 100 to learn more detailed expected behavior or normalcy models 126 incorporated into model 125 that can be used to dramatically improve detection accuracy.

In one embodiment, the sensed and logged data is provided to an event collection correlation algorithm, machine learning algorithm and anomaly detection algorithm implemented in a system 140. Machine learning is employed in the system 140 to update the model 125. The event collection and management algorithm provides information regarding events to an observations algorithm, which provides observations about the events. The model 325 is used by system 140 to compare the observations to the model and detect anomalies. The anomalies detected are used to generate patterns of anomalies that may be suspicious.

Accurate algorithms are only part of the complete solution. Patterns of suspicious behavior, also referred to as anomolies are a product of the algorithm's internal reference model 325 of the monitored individual's behavior and attack actions. Most of the time, these models are implicit in the algorithm itself; when the algorithm makes a choice about the maliciousness of observed activity, it is applying its internal models, and therefore, the results are limited to the model's accuracy and coverage. In one embodiment, explicit insider behavior models are employed at a correlation point where indicators from multiple algorithms are reinforced to provide higher value alerts, and to reduce false positives.

In one embodiment, correlation is performed by system 150 based on the CHAMPION reasoning engine. The reasoning engine combines several unique characteristics including the ability to integrate multiple data types and sources and a reasoning engine that is modeled after human pattern recognition processes. CHAMPION has been applied to detect malicious intent from psychological indicators. In one embodiment, CHAMPION's algorithm is extended in system 150 to reason over suspicious behaviors and aggregate them with policy violations.

System 100 collects and analyzes both cyber and physical resource access data. To interpret the results of its analysis, system 140 maintains global system information in insider threat reference model 125. The insider threat reference model 125 stores attributes of the system being protected. Example attributes include topology of the system, logical connections, policies and rules in effect, monitored subjects and their roles, identified attack types, alert levels, expected behaviors of the monitored subjects, type of threats to be protected against, likely insider attack plans, and potential countermeasures.

System 100 will detect anomalies in the behavior of monitored individuals based on models of normalcy that are learned from historical data. The insider threat reference model 125 will provide the knowledge needed to combine the judgments of a wide variety of anomaly detectors, using widely varying sources of information and algorithms, into a much smaller set of malicious behaviors. System 100's reasoning engine in system 140 uses an Insider Threat Domain Ontology 151 to reduce the flood of data from anomaly detectors to a trickle of high-confidence malicious behavior hypotheses.

System 100 uses fine-grained policies to decide how to respond to resource access requests. The policies are implemented in a language that allows specification of more nuanced policies, significantly narrowing the gap between desired and implemented policies. The access control system 100 can detect policy violations that are reported to system 140 reasoning engine to further disambiguate competing behavior hypotheses. The insider threat reference model 125 moves situation assessment intelligence away from rules embedded in remote sensors into a maintainable knowledge base. As system 100 detects anomalies and generates hypothesized explanations, its access control system 120 reacts to (potential) breaches by adjusting its responses to protect the assets from further exploitation in real attack situations. The result: system 100 automatically and dynamically creates and executes access control policies 152 tailored to the current situation. Finally, based on the results of anomaly detection, a security analyst 155 receives alerts, watchlists, and notification from the reasoner in system 140 and can adjust existing or initial coarse-grained policies via a policy refinement so they become increasingly more accurate.

System 100 provides automated support to not only detect suspicious activity, but also to perform analysis of spatial/temporal data to reduce the list of possible perpetrators incrementally and successively. In addition, after the detected anomaly has been confirmed by a system administrator, system 100 can guide the administrator in revising access control policy to prevent similar attacks from occurring in the future and in some cases automatically modify access control policies. The automatic modification of access control policies may be performed to implement, for example, predetermined access restrictions in response to severity of threat.

System 100 uses machine learning algorithms to induce patterns from both cyber and physical access logs. For example, learning models of normal network activity reflected in normalcy models 126 allows system 100 to detect unusual network activity—suspected instances of isolated illegal transmissions to a single destination by several employees. Learning employees' work schedules from cyber and physical activities as well as learning negative correlations between employees' access to classified areas and their cyber activity at the desktops allows system 100 to detect unexpected cyber activity when an employee is probably not at their desk.

As system 100 detects anomalies, it generates hypotheses to explain them. Some anomalies, such as isolated instances of suspicious behaviors, will not rise above the risk threshold requiring immediate actions. For example, when a malicious insider explores areas of an embassy (reconnaissance activities), the system 100 flags these actions as unusual but at this point does not find them suspicious enough to warrant defensive action; additional information is required to produce a conclusive judgment.

When the perpetrator starts leaking sensitive information, the monitored data reflects a combination of unusual network activity and probable absence of the employees; analytic reasoning weighs competing hypotheses of either benign behavior (unusual transmission and undetected presence of employees at their desks) or malicious behavior (unusual transmission performed by someone else).

Evidence accumulates about the pattern of unusual transmission of data from the same work area and addressed to the same destination IP address. This analysis leads to the hypothesis that somebody is using other employees' computers to leak sensitive information, which triggers additional analysis to identify the culprit.

The analysis of network activity identifies a small number of employees involved in a large fraction of transmissions (both usual and unusual) to the IP address of suspicious transmissions. Analysis of both cyber and physical data will identify another small group of employees present in the work area at the time of suspicious activities. Combining all of the evidence, including prior detections of suspicious behavior, system 100 identifies the most likely culprit.

In the above scenario, an exfiltration attack could have been prevented at several stages. To gain access to other employees' computers, an insider may have to guess their passwords. A pattern of unsuccessful login attempts clustered around the same work location triggers a password reset requirement from the access control system.

When a rogue employee uses other means (such as social engineering) to obtain passwords or attempts to access unlocked desktops, after inferring that a computer owner is not at their desk, the access control system will learn to ask for additional authentication. At the point when the perpetrator plans to send the data to a competing company, the system is already taking steps to "lock down" or restrict the activities of the most suspicious "persons of interest." When a pattern of unusual transmission begins to emerge, the system holds suspect transmissions for further analysis (even if the sender passes additional authentication).

This brief scenario illustrates several of the system 100 functions, including the ability to detect insider threats, sift through massive amounts of data to hypothesize relevant theories, and dynamically adjust its defense mechanism without compromising asset availability for legitimate use. These capabilities of system 100 directly address the gaps identified by the analysis of several published insider threat cases including, but not limited to, embassy and financial sectors.

Figure 2:
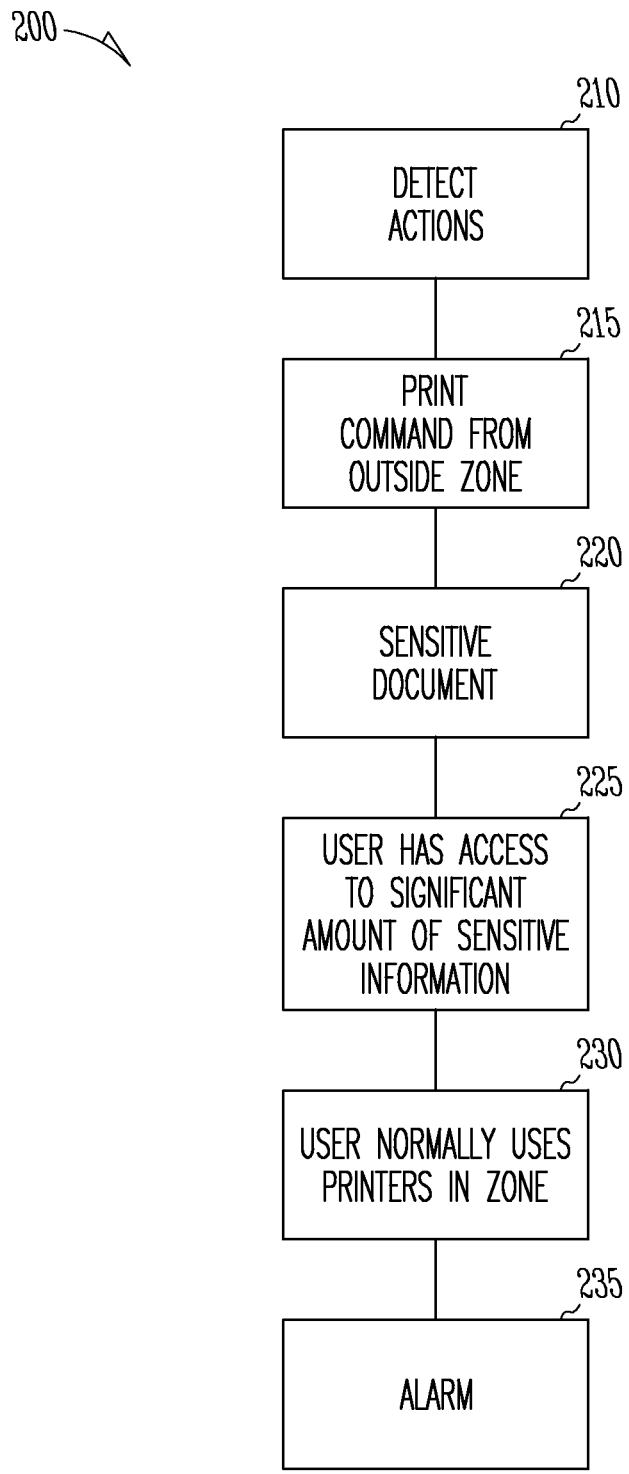
FIG. 2 is a flowchart illustrating a high level operation of the access control system of FIG. 1.

In one example method 200 in FIG. 2, detection and identification of potentially malicious behavior utilizes data related to both physical cyber assets, a potentially malicious insider with access to a lot of sensitive information attempts to print proprietary/confidential information, but sends the print command to a printer outside his zone of work and using a common laboratory computer for stealth purposes. This action may be referred to as an event or action in various embodiments. The action, and other actions from both physical and cyber access control systems are detected at 210.

The insider threat detection system, however, raises an alarm after observing at 215, that the printer does not usually get print commands from outside its zone, at 220, that the document being printed has a "sensitive" label on it, at 225, that the user sending the command has access to a lot of sensitive information in the company, and at 230, that the user usually sends print commands to printers in his zone, etc. In response to this action and observations, the alarm may be raised at 235. Other observations about the action may also be used to determine whether an action or set of actions represents suspicious behavior.

In one embodiment, system 100 first learns context around observations, then learns observation models of normal activities similarly to our approach to learning models of people's behavior from sensor data. To detect anomalies, machine learning algorithms in system 140 deduce normalcy models of two types from observations in cyber or physical access logs: action-pattern-based models of normal activity or information-theoretic models of normal activity scopes, such as entropy and conditional probabilities.

In one embodiment, learning pattern-based activity models model relationships between observations as a graph, where each node is an observation and edges between nodes indicate the relationship between observations, which is quantified by the edge weight. In this representation, an activity model is defined as a partially ordered set of nodes with strong relationships (i.e., large weights). An activity is detected by searching for a sequence or group of nodes that have large weights between them.

Various methods can be used for this search, including graph spectral clustering. These methods are limited to sequences of single observation types with scalar weights and use greedy search algorithms. In one embodiment, multiple action types will be encountered with varying relationship models that span varying time continuums. Spectral methods are extended to discover high-weight subsequences embedded in very large multi-weight graphs. Heuristic strategies may be used for searching the space of possible paths.

To facilitate indicator detection, a hierarchy of "atomic" pattern-based models may be used such that all normal data can be explained from legal combinations of atomic models. This method allows inferencing suspicious behaviors from a series of observations that separately are not anomalous but together are suspicious.

The available space of activity models is very large due to the complexity of human behavior. A concept language (a.k.a. descriptive logics) may be used to keep the rule space manageable. Concept languages allow complex predicates to be defined from simple ones. The complex predicates can then be combined using logical operations (such as conjunction, disjunction, and negation). Aside from helping manage the size of the model space, the concept language provides a simple way to express domain knowledge heuristics, which can be used to further constrain the space. Observations in a specific context may become abnormal in another context. To avoid over fitting and increased false positive rates, subspace clustering is used to learn the appropriate features for each model.

Reducing the number of false alarms may utilize corroboration and correlation of suspicious behaviors detected by the various algorithms. System 100 exploits the overlap in the indicators that the models can detect in one embodiment.

In one embodiment, system 100 explores the hypothesis space to determine which indicators are consistent with malicious behaviors and which have benign explanations. In one embodiment, the indicators-to-behavior belief propagation process uses the reasoning engine in system 140, which comprises a hierarchical structure of modified case-based reasoners (CBRs) extended with predictive functionality. The CBRs use description logic to decide if the observed data and suspicious behaviors propagated from lower in the hierarchy are consistent with the hypothesized malicious behavior. If the suspicious behaviors are consistent, new "assertions" are dynamically stored in the system's working memory (a semantic graph structure). Unlike classical approaches that compare the hypothesis against all "cases" or the entire semantic graph (which can be prohibitively large), the more tractable system 100 analyzes a subset of the semantic graph. To guide reasoning about physical access control infrastructures (time-location concepts) to be integrated with cyber data, ontological representations that reflect knowledge about space-time concepts, cyber behaviors and the asynchronous arrival of data and indicators are added. A distinct advantage of the reasoning approach is its ability to integrate data from multiple sources and to propagate the analysis to higher-level abstractions.

Applying a semantic layer upon the data enables the graph-theoretic approach to implement prediction, detection, and mitigation options. With a well-formed semantic layer, computational intractability may be overcome by performing reasoning on subsets of the semantic graph of data. The belief propagation network performs a transformation of the low-level literal inputs into higher-level abstractions when the salient facts are present.

In addition to its novel and effective approach to detecting malicious behavior, system 100 may prevent many attacks via its access-control component, which will support the specification and enforcement of a variety of nuanced, flexible access-control policies that are outside of the range of most access-control systems today.

Figure 3:
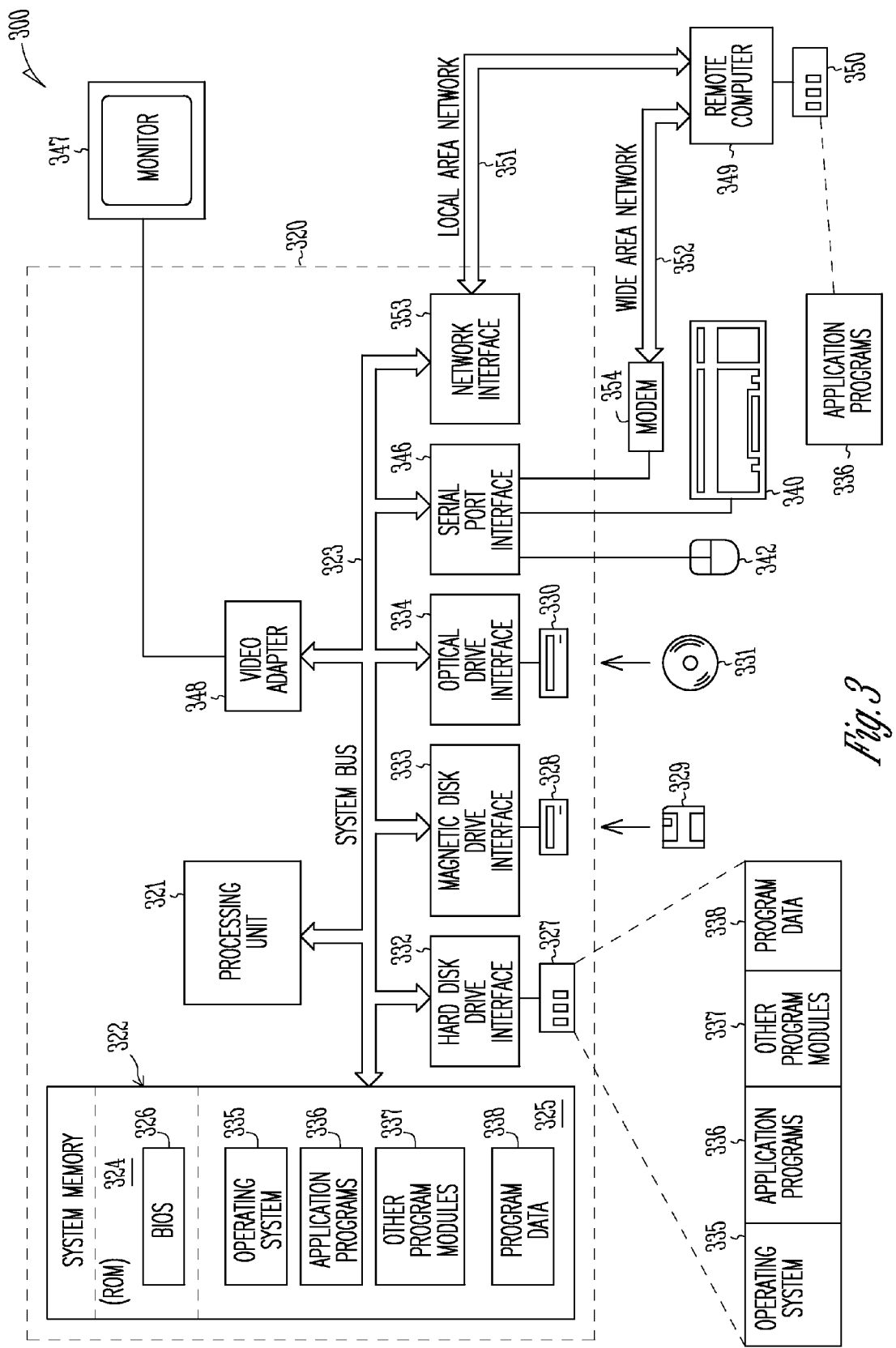
FIG. 3 is a block diagram of a computer system for executing one or more methods and modules of an access control system according to an example embodiment.

FIG. 3 is a block diagram of a computer system to implement methods according to an example embodiment. In the embodiment shown in FIG. 3, a hardware and operating environment is provided that is applicable to any of the controllers, modules, methods, and system shown in the other Figures.

As shown in FIG. 3, one embodiment of the hardware and operating environment includes a general purpose computing device in the form of a computer 300 (e.g., a personal computer, workstation, or server), including one or more processing units 321, a system memory 322, and a system bus 323 that operatively couples various system components including the system memory 322 to the processing unit 321. There may be only one or there may be more than one processing unit 321, such that the processor of computer 300 comprises a single central-processing unit (CPU), or a plurality of processing units, commonly referred to as a multiprocessor or parallel-processor environment. In various embodiments, computer 300 is a conventional computer, a distributed computer, or any other type of computer. For each of the methods or modules implemented, not all the components described in FIG. 3 may be needed or desired.

The system bus 323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 324 and random-access memory (RAM) 325. A basic input/output system (BIOS) program 326, containing the basic routines that help to transfer information between elements within the computer 300, such as during start-up, may be stored in ROM 324. The computer 300 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD ROM or other optical media.

The hard disk drive 327, magnetic disk drive 328, and optical disk drive 330 couple with a hard disk drive interface 332, a magnetic disk drive interface 333, and an optical disk drive interface 334, respectively. The drives and their associated computer-readable media provide non volatile storage of computer-readable instructions, data structures, program modules and other data for the computer 300. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 329, optical disk 331, ROM 324, or RAM 325, including an operating system 335, one or more application programs 336, other program modules 337, and program data 338. Programming for implementing one or more processes or method described herein may be resident on any one or number of these computer-readable media.

A user may enter commands and information into computer 300 through input devices such as a keyboard 340 and pointing device 342. Other input devices (not shown) can include a microphone, joystick, game pad, satellite dish, scanner, or the like. These other input devices are often connected to the processing unit 321 through a serial port interface 346 that is coupled to the system bus 323, but can be connected by other interfaces, such as a parallel port, game port, or a universal serial bus (USB). A monitor 347 or other type of display device can also be connected to the system bus 323 via an interface, such as a video adapter 348. The monitor 347 can display a graphical user interface for the user. In addition to the monitor 347, computers typically include other peripheral output devices (not shown), such as speakers and printers.

The computer 300 may operate in a networked environment using logical connections to one or more remote computers or servers, such as remote computer 349. These logical connections are achieved by a communication device coupled to or a part of the computer 300; the invention is not limited to a particular type of communications device. The remote computer 349 can be another computer, a server, a router, a network PC, a client, a peer device or other common network node, and typically includes many or all of the elements described above 110 relative to the computer 300, although only a memory storage device 350 has been illustrated. The logical connections depicted in FIG. 3 include a local area network (LAN) 351 and/or a wide area network (WAN) 352. Such networking environments are commonplace in office networks, enterprise-wide computer networks, intranets and the internet, which are all types of networks.

When used in a LAN-networking environment, the computer 300 is connected to the LAN 351 through a network interface or adapter 353, which is one type of communications device. In some embodiments, when used in a WAN-networking environment, the computer 300 typically includes a modem 354 (another type of communications device) or any other type of communications device, e.g., a wireless transceiver, for establishing communications over the wide-area network 352, such as the internet. The modem 354, which may be internal or external, is connected to the system bus 323 via the serial port interface 346. In a networked environment, program modules depicted relative to the computer 300 can be stored in the remote memory storage device 350 of remote computer, or server 349. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

Example 1

A method comprising:
 obtaining data related to accessing cyber assets and accessing physical assets from a combined cyber access and physical access control system that protects cyber and physical assets of an organization from both authorized and unauthorized access with malicious intent;
 comparing the data to known patterns of expected behavior;
 identifying patterns of suspicious behavior as a function of comparing the data to the patterns of expected behavior; and
 utilizing the comparison to identify potentially malicious insider behavior toward the cyber and physical assets.

Example 2

The method of example 1 wherein expected behavior is inferred using machine learning algorithms.

Example 3

The method of example 1 and further comprising using the machine learning algorithms and the data from the cyber and physical access control system to build expected behavior models representative of expected behavior.

Example 4

The method of example 3 wherein the normalcy models describe both physical and logical access data to detect suspicious insider behavior using anomaly detection.

Example 5

The method of example 1 wherein the data includes at least one of email traffic, internet traffic, remote access traffic, and at least one of building information model, card proxy, RFID, and physical access policies.

Example 6

The method of example 5 wherein data representative of expected behavior is selected from the group consisting of, patterns of accessing physical and cyber resources in the work environment, physical and logical access to the assets consistent with the insider role, location, restricted access attempts, authentication attempts, web sites accessed, accessed file size, an installing scripts.

Example 7

The method of example 6 wherein the suspicious behaviors are selected from the group consisting of change in work schedule, access attempts against privilege, suspicious movements, suspicious communications, and harvesting of proprietary data.

Example 8

The method of example 1 wherein identifying patterns of suspicious behavior as a function of comparing the combined data to the patterns of normal behavior further includes using a reasoning engine to correlate the suspicious behaviors over time and location to identify the potentially malicious behavior.

Example 9

The method of example 8 and further comprising:
providing alerts and notifications to a user; and
permitting dynamic modification of access control policies based on the alerts and notifications.

Example 10

The method of example 9 wherein dynamic modifications include dynamic short term changes to access permissions for an insider to limit access to assets while allowing some access to allow the insider to perform their role.

Example 11

The method of example 9 wherein dynamic modifications include modification of the access control policies to broaden or narrow access permissions.

Example 12

A computer readable storage device having instructions to cause a computer to implement a method identifying potentially malicious behavior, the method comprising:
obtaining data related to accessing cyber assets and accessing physical assets from a combined cyber access and physical access control system that protects cyber and physical assets of an organization from both authorized and unauthorized access with malicious intent;
comparing the data to known patterns of expected behavior;
identifying patterns of suspicious behavior as a function of comparing the data to the patterns of expected behavior; and
utilizing the comparison to identify potentially malicious insider behavior toward the cyber and physical assets.

Example 13

The computer readable storage device of example 12 wherein expected behavior is inferred using machine learning algorithms, and wherein the method further comprises using the machine learning algorithms and the data from the cyber and physical access control system to build expected behavior models representative of expected behavior.

Example 14

The computer readable storage device of example 11 wherein the data includes at least one of email traffic, internet traffic, remote access traffic, and at least one of building information model, card proxy, RFID, and physical access policies, and wherein data representative of expected behavior is selected from the group consisting of patterns of accessing physical and cyber resources in the work environment, physical and logical access to the assets consistent with the insider role, location, restricted access attempts, authentication attempts, web sites accessed, accessed file size, an installing scripts, and where suspicious behaviors are selected from the group consisting of change in work schedule, access attempts against privilege, suspicious movements, suspicious communications, and harvesting of proprietary data.

Example 15

The computer readable storage device of example 12 wherein identifying patterns of suspicious behavior as a function of comparing the combined data to the patterns of normal behavior further includes using a reasoning engine to correlate the suspicious behaviors over time and location to identify the potentially malicious behavior.

Example 16

The computer readable storage device of example 15 and further comprising:
providing alerts and notifications to a user; and
permitting dynamic modification of access control policies by the user based on the alerts and notifications, wherein dynamic modifications include dynamic short term changes to access permissions for an insider to limit access to assets, and wherein dynamic modifications include modification of the access control policies to broaden or narrow access permissions.

Example 17

A device comprising:
an access control system to receive data regarding behavior involving accessing physical and cyber assets;
a storage device storing an insider threat reference model that includes patterns of expected behavior;
an anomaly detector that compares the data to the known patterns of expected insider behavior to identify suspicious behaviors;
a reasoning engine that uses identified suspicious behavior to identify potentially malicious behaviors toward the cyber and physical assets.

Example 18

The device example 17 wherein the data includes at least one of email traffic, internet traffic, remote access traffic, and at least one of building information model, card proxy, RFID, and physical access policies, and wherein data representative of expected behavior is selected from the group consisting of patterns of accessing physical and cyber resources in the work environment, physical and logical access to the assets consistent with the insider role, location, restricted access attempts, authentication attempts, web sites accessed, accessed file size, an installing scripts, change in work schedule, access attempts against privilege, suspicious movements, suspicious communications, and harvesting of proprietary data.

Example 19

The device example 17 wherein the reasoning engine provides alerts and notifications to a user, and further comprising a policy refinement module that facilitates dynamic modification of access control policies based on the alerts and notifications, wherein dynamic medications include dynamic short term changes to access permissions for an insider to limit access to assets, and wherein dynamic medications include modification of the access control policies to broaden or narrow the access control policies allowing some access to allow the insider to perform their role.

Example 20

The device of example 17 wherein the insider threat reference model further includes at least one of a building information model, network topology, organizational policy and organization structure.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   obtaining, from a storage device, data related to accessing cyber assets and accessing physical assets from a combined cyber access and physical access control system that protects cyber and physical assets of an organization from both authorized and unauthorized access with malicious intent;
   applying machine learning algorithms to data from the cyber and physical access control system to build expected behavior models representative of expected behavior, the expected behavior models based on a context and a relationship of the data related to accessing cyber assets and accessing physical assets;
   comparing, via a programmed computer, newly obtained data to known patterns of expected behavior as represented in the expected behavior models, the comparing including abstracting the newly obtained data to reduce a searching element of the comparing to a subset of a semantic graph representing the known patterns of expected behavior;
   identifying, via the programmed computer, patterns of suspicious behavior as a function of comparing the data to the known patterns of expected behavior; and
   utilizing the comparison to identify, via the programmed computer, potentially malicious insider behavior toward the cyber and physical assets.

2. The method of claim 1 wherein the expected behavior models describe both physical and logical access data to detect suspicious insider behavior using anomaly detection.

3. The method of claim 1 wherein the data includes at least one of email traffic, internet traffic, remote access traffic, and at least one of building information model, card proxy, RFID, and physical access policies.

4. The method of claim 3 wherein data representative of expected behavior is selected from the group consisting of, patterns of accessing physical and cyber resources in the work environment, physical and logical access to the assets consistent with the insider role, location, restricted access attempts, authentication attempts, web sites accessed, accessed file size, an installing scripts.

5. The method of claim 4 wherein the suspicious behaviors are selected from the group consisting of change in work schedule, access attempts against privilege, suspicious movements, suspicious communications, and harvesting of proprietary data.

6. The method of claim 1 wherein identifying patterns of suspicious behavior as a function of comparing the combined data to the known patterns of expected behavior further includes using a reasoning engine to correlate the suspicious behaviors over time and location to identify the potentially malicious behavior.

7. The method of claim 6 and further comprising:
   providing alerts and notifications to a user; and
   permitting dynamic modification of access control policies based on the alerts and notifications.

8. The method of claim 7 wherein dynamic modifications include dynamic short term changes to access permissions for an insider to limit access to assets while allowing some access to allow the insider to perform their role.

9. The method of claim 7 wherein dynamic modifications include modification of the access control policies to broaden or narrow access permissions.

10. A computer readable storage device having instructions to cause a computer to implement a method identifying potentially malicious behavior, the method comprising:
    obtaining data related to accessing cyber assets and accessing physical assets from a combined cyber access and physical access control system that protects cyber and physical assets of an organization from both authorized and unauthorized access with malicious intent;
    apply machine learning algorithms to data from the cyber and physical access control system to build expected behavior models representative of expected behavior, the expected behavior models based on a context and a relationship of the data related to accessing cyber assets and accessing physical assets;
    comparing newly obtained data to known patterns of expected behavior as represented in the expected behavior models, the comparing including abstracting the newly obtained data to reduce a searching element of the comparing to a subset of a semantic graph representing the known patterns of expected behavior;
    identifying patterns of suspicious behavior as a function of comparing the data to the known patterns of expected behavior; and
    utilizing the comparison to identify potentially malicious insider behavior toward the cyber and physical assets.

11. The computer readable storage device of claim 10 wherein the data includes at least one of email traffic, internet traffic, remote access traffic, and at least one of building information model, card proxy, RFID, and physical access policies, and wherein data representative of expected behavior is selected from the group consisting of patterns of accessing physical and cyber resources in the work environment, physical and logical access to the assets consistent with the insider role, location, restricted access attempts, authentication attempts, web sites accessed, accessed file size, an installing scripts, and where suspicious behaviors are selected from the group consisting of change in work schedule, access attempts against privilege, suspicious movements, suspicious communications, and harvesting of proprietary data.

12. The computer readable storage device of claim 10 wherein identifying patterns of suspicious behavior as a function of comparing the combined data to the patterns of normal behavior further includes using a reasoning engine to correlate the suspicious behaviors over time and location to identify the potentially malicious behavior.

13. The computer readable storage device of claim 12 and further comprising:
providing alerts and notifications to a user; and
permitting dynamic modification of access control policies by the user based on the alerts and notifications, wherein dynamic modifications include dynamic short term changes to access permissions for an insider to limit access to assets, and wherein dynamic modifications include modification of the access control policies to broaden or narrow access permissions.

14. A device comprising:
an access control system to receive data regarding behavior involving accessing physical and cyber assets;
a storage device storing an insider threat reference model that includes patterns of expected behavior, the patterns of expected behavior represented in stored expected behavior models representative of expected behavior, the expected behavior models based on a context and a relationship of the data related to accessing cyber assets and accessing physical assets and built by a plying machine learning algorithms to data from the access control system;
an anomaly detector, to identify suspicious behaviors, that compares newly obtained data to the known patterns of expected insider behavior as represented in the expected behavior models, the comparing including abstracting the newly obtained data to reduce a searching element of the comparing to a subset of a semantic graph representing the known patterns of expected behavior;
a reasoning engine that uses identified suspicious behavior to identify potentially malicious behaviors toward the cyber and physical assets.

15. The device claim 14 wherein the data includes at least one of email traffic, internet traffic, remote access traffic, and at least one of building information model, card proxy, RFID, and physical access policies, and wherein data representative of expected behavior is selected from the group consisting of patterns of accessing physical and cyber resources in the work environment, physical and logical access to the assets consistent with the insider role, location, restricted access attempts, authentication attempts, web sites accessed, accessed file size, an installing scripts, change in work schedule, access attempts against privilege, suspicious movements, suspicious communications, and harvesting of proprietary data.

16. The device claim 14 wherein the reasoning engine provides alerts and notifications to a user, and further comprising a policy refinement module that facilitates dynamic modification of access control policies based on the alerts and notifications, wherein dynamic medications include dynamic short term changes to access permissions for an insider to limit access to assets, and wherein dynamic medications include modification of the access control policies to broaden or narrow the access control policies allowing some access to allow the insider to perform their role.

17. The device of claim 14 wherein the insider threat reference model further includes at least one of a building information model, network topology, organizational policy and organization structure.

* * * * *